(12) United States Patent
Jeong

(10) Patent No.: US 11,144,270 B2
(45) Date of Patent: Oct. 12, 2021

(54) ELECTRONIC APPARATUS AND METHOD OF DRIVING THE SAME

(71) Applicant: Samsung Display Co., Ltd., Yongin-si (KR)

(72) Inventor: Heesoon Jeong, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1 day.

(21) Appl. No.: 16/182,099

(22) Filed: Nov. 6, 2018

(65) Prior Publication Data
US 2019/0179590 A1 Jun. 13, 2019

(30) Foreign Application Priority Data
Dec. 13, 2017 (KR) ........................ 10-2017-0171609

(51) Int. Cl.
| | |
|---|---|
| *G09G 3/36* | (2006.01) |
| *G06F 3/14* | (2006.01) |
| *G06F 3/0488* | (2013.01) |
| *G09G 5/14* | (2006.01) |
| *G06F 3/041* | (2006.01) |
| *G06F 3/147* | (2006.01) |

(52) U.S. Cl.
CPC ........ *G06F 3/1446* (2013.01); *G06F 3/04186* (2019.05); *G06F 3/04883* (2013.01); *G06F 3/147* (2013.01); *G06F 3/1423* (2013.01); *G06F 3/1431* (2013.01); *G06F 3/1438* (2013.01); *G09G 5/14* (2013.01); *G06F 3/0416* (2013.01); *G06F 2203/04104* (2013.01); *G06F 2203/04808* (2013.01); *G09G 2310/0267* (2013.01); *G09G 2310/0275* (2013.01); *G09G 2340/14* (2013.01); *G09G 2354/00* (2013.01); *G09G 2360/145* (2013.01)

(58) Field of Classification Search
CPC combination set(s) only.
See application file for complete search history.

(56) References Cited

U.S. PATENT DOCUMENTS

| | | | |
|---|---|---|---|
| 9,578,149 B2 | 2/2017 | Moon et al. | |
| 2012/0083319 A1* | 4/2012 | Sirpal | G06F 1/1616 455/566 |
| 2012/0242605 A1* | 9/2012 | Sato | G06F 3/0416 345/173 |
| 2013/0093742 A1* | 4/2013 | Lin | G09G 3/3688 345/211 |

(Continued)

FOREIGN PATENT DOCUMENTS

| | | |
|---|---|---|
| KR | 10-2015-0066313 A | 6/2015 |
| KR | 10-2015-0080741 A | 7/2015 |

(Continued)

*Primary Examiner* — Pegeman Karimi
(74) *Attorney, Agent, or Firm* — Lewis Roca Rothgerber Christie LLP

(57) ABSTRACT

An electronic apparatus includes a display part, a touch screen, and a display controller. The display part includes a first display area and a second display area opposite to the first display area. The touch screen is configured to sense a first touch input from the first display area and a second touch input from the second display area. The display controller is configured to control activation and deactivation of the first display area and the second display area based on the first touch input and the second touch input.

17 Claims, 12 Drawing Sheets

(56) References Cited

U.S. PATENT DOCUMENTS

| | | | |
|---|---|---|---|
| 2015/0227224 A1* | 8/2015 | Park | G06F 1/1643 |
| | | | 345/173 |
| 2015/0378503 A1* | 12/2015 | Seo | G06F 3/04847 |
| | | | 345/173 |
| 2016/0313846 A1* | 10/2016 | Hong | G06F 3/0412 |
| 2016/0320966 A1* | 11/2016 | Ryu | G06F 3/165 |
| 2017/0285851 A1* | 10/2017 | Yang | G06F 1/3287 |
| 2018/0373408 A1* | 12/2018 | Lee | G01S 17/026 |
| 2019/0034147 A1* | 1/2019 | Koki | G06F 3/0488 |

FOREIGN PATENT DOCUMENTS

| | | |
|---|---|---|
| KR | 10-2017-0046915 A | 5/2017 |
| KR | 10-2017-0046977 A | 5/2017 |
| KR | 10-2017-0084586 A | 7/2017 |

\* cited by examiner

ELECTRONIC APPARATUS AND METHOD OF DRIVING THE SAME

CROSS-REFERENCE TO RELATED APPLICATION

This application claims priority to and the benefit of Korean Patent Application No. 10-2017-0171609, filed on Dec. 13, 2017 in the Korean Intellectual Property Office, the entire content of which is incorporated by reference herein.

BACKGROUND

1. Field

Aspects of embodiments of the present inventive concept relate to an electronic apparatus and a method of driving an electronic apparatus.

2. Description of the Related Art

Recently, an electronic apparatus including a multiple-display apparatus having a plurality of display surfaces has been developed. For example, a mobile apparatus may include a front display area and a side display area disposed at a left side or a right side of the front display area. Furthermore, an electronic apparatus including a wrap-around display including four display surfaces of the electronic apparatus has been developed. The electronic apparatus including the wraparound display may output a continuous image through a front surface, a rear surface, a left side surface, and a right side surface.

The plurality of the display surfaces of the multiple-display apparatus may be partially used such that a new control method may be required or desirable.

SUMMARY

According to an aspect of embodiments of the present inventive concept, an electronic apparatus includes a plurality of display areas. According to another aspect of embodiments of the present inventive concept an electronic apparatus enhancing user convenience is provided.

According to another aspect of embodiments of the present inventive concept a method of driving the electronic apparatus is provided.

According to one or more embodiments of the present inventive concept, an electronic apparatus includes a display part, a touch screen, and a display controller. The display part includes a first display area and a second display area opposite to the first display area. The touch screen is configured to sense a first touch input from the first display area and a second touch input from the second display area. The display controller is configured to control activation and deactivation of the first display area and the second display area based on the first touch input and the second touch input.

In an exemplary embodiment, the display controller may be configured to deactivate the first display area when a first touch area of the first touch input is larger than a first threshold area (e.g., a predetermined first threshold area).

In an exemplary embodiment, the display controller may be configured to activate the first display area and deactivate the second display area when a first touch area of the first touch input is less than a second touch area of the second touch input.

In an exemplary embodiment, the display controller may be configured to set the first display area as a main display area displaying a main image and set the second display area as a sub display area displaying a sub image when a first touch area of the first touch input is less than a second touch area of the second touch input.

In an exemplary embodiment, the display controller may be configured to deactivate the first display area when a number of touches of the first touch input is equal to or greater than three.

In an exemplary embodiment, the display controller may be configured to activate the first display area and deactivate the second display area when a first number of touches of the first touch input is less than a second number of touches of the second touch input.

In an exemplary embodiment, the display controller may be configured to set the first display area as a main display area displaying a main image and set the second display area as a sub display area displaying a sub image when a first number of touches of the first touch input is less than a second number of touches of the second touch input.

In an exemplary embodiment, the display controller may be configured to control the activation and the deactivation of at least one of the first display area and the second display area based on a pattern when the first touch input is a drag operation which forms the pattern.

In an exemplary embodiment, the display controller may be configured to deactivate the first display area when the first touch input is the drag operation from a first position toward a first direction.

In an exemplary embodiment, the display controller may be configured to control the activation and the deactivation of the first display area and the second display area based on a sensing signal received from a sensor module.

In an exemplary embodiment, the sensor module may include at least one of an illumination sensor, a sound sensor, and a gyro sensor.

In an exemplary embodiment, the display controller may be configured to activate the first display area and deactivate the second display area when an intensity of a first illumination sensed in the first display area is greater than an intensity of a second illumination sensed in the second display area.

In an exemplary embodiment, the display controller may be configured to activate the first display area and deactivate the second display area when a first sound sensed on the first display area is greater than a second sound sensed on the second display area.

In an exemplary embodiment, the display controller may be configured to activate the first display area and deactivate the second display area when the second display area is toward a ground.

In an exemplary embodiment, the display part may include a first display apparatus and a second display apparatus. The first display apparatus may include a first display panel including the first display area, and a first panel driver configured to drive the first display panel. The second display apparatus may include a second display panel including the second display area, and a second panel driver configured to drive the second display panel. The display controller may be configured to control a power supply to the first display apparatus and the second display apparatus based on the first touch input and the second touch input.

In an exemplary embodiment, the display part may further include a third display area connecting a side of the first display area and a side of the second display area.

In an exemplary embodiment, the touch screen may be configured to sense a third touch input from the third display area. The activation and the deactivation of the first display area and the second display area may be controlled based on the third touch input.

According to one or more embodiments of the present inventive concept, a method of driving an electronic apparatus including a display apparatus including a first display area and a second display area opposite to the first display area includes: receiving at least one of a first touch input from the first display area and a second touch input from the second display area; determining a driving mode based on the first touch input and the second touch input; and controlling activation and deactivation of the first display area and the second display area according to the driving mode.

In an exemplary embodiment, the determining the driving mode may include determining a first touch area of the first touch input, determining a second touch area of the second touch input, and determining one of a first driving mode, a second driving mode, and a third driving mode as the driving mode based on the first touch area and the second touch area. The first driving mode activates the first display area and deactivates the second display area. The second driving mode activates the first display area and activates the second display area. The third driving mode deactivates the first display area and activates the second display area.

In an exemplary embodiment, the determining the driving mode may include determining a first number of touches of the first touch input, determining a second number of touches of the second touch input, and determining one of a first driving mode, a second driving mode, and a third driving mode as the driving mode based on the first number of touches and the second number of touches. The first driving mode activates the first display area and deactivates the second display area. The second driving mode activates the first display area and activates the second display area. The third driving mode deactivates the first display area and activates the second display area.

In an exemplary embodiment, the method may further include controlling the activation and the deactivation of the first display area and the second display area based on a sensing signal received from a sensor module.

According to an aspect of the electronic apparatus of the present inventive concept, the electronic apparatus includes a multiple-display apparatus including a plurality of display areas (or display surfaces). Based on a touch input (e.g., a touch area, a number of touches, a touch motion) from the display areas, an activated display area may be selected, and activation and deactivation of the display areas may be controlled such that user convenience may be enhanced. In addition, the electronic apparatus drives the display areas using a plurality of independent display apparatuses and the display apparatus corresponding to the deactivated display area is turned off such that power consumption may be reduced.

According to another aspect, the electronic apparatus may include a front display area and a rear display area, and any of plural sensors (e.g., a camera, a proximity sensor, a fingerprint sensor) are disposed in a surface (e.g., a front surface) such that a dead space may be decreased, a display region may be increased, and utilization of the sensors may be enhanced.

According to an aspect of a method of driving the electronic apparatus of the present inventive concept, the activation and the deactivation of the display areas are controlled based on the sensing signals such that user convenience may be enhanced.

BRIEF DESCRIPTION OF THE DRAWINGS

The above and other features and aspects of the present inventive concept will become more apparent by describing in some exemplary embodiments thereof with reference to the accompanying drawings, in which.

DETAILED DESCRIPTION

Herein, the present inventive concept will be explained in further detail with reference to the accompanying drawings.

Figure 1:
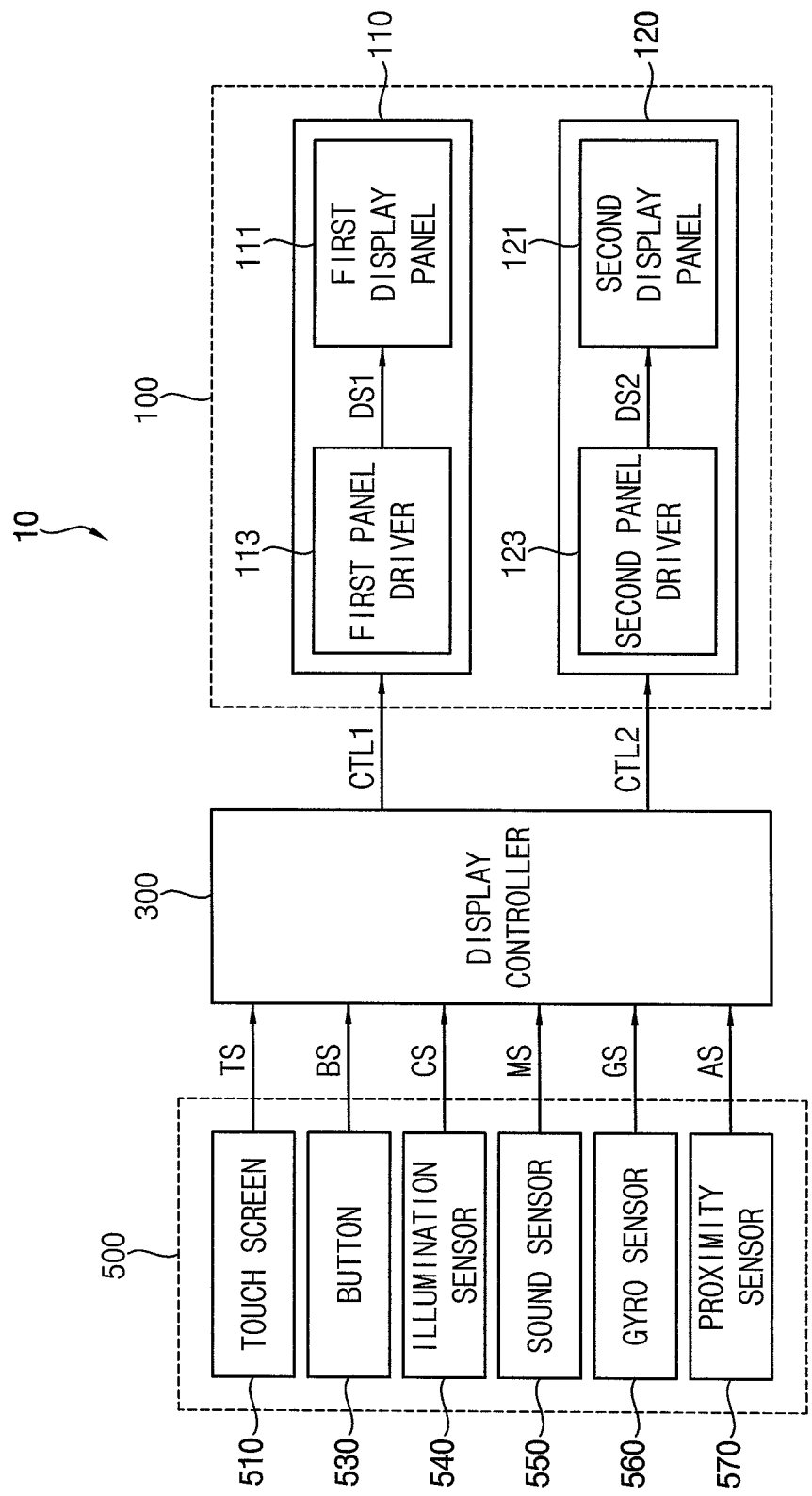
FIG. 1 is a block diagram illustrating an electronic apparatus according to an exemplary embodiment of the present inventive concept.

FIG. 1 is a block diagram illustrating an electronic apparatus 10 according to an exemplary embodiment of the present inventive concept.

Referring to FIG. 1, the electronic apparatus 10 includes a display part 100, a display controller 300, and a sensor module 500.

The display part 100 includes a multiple-display apparatus including a plurality of display surfaces. The display part 100 may include a first display area and a second display area opposite to the first display area.

In an exemplary embodiment, the display part 100 may include a first display apparatus 110 and a second display apparatus 120 which may be independently driven from each other. The first display apparatus 110 may include a first display panel 111 and a first panel driver 113 driving the first display panel 111. The second display apparatus 120 may include a second display panel 121 and a second panel driver 123 driving the second display panel 121.

The first display panel 111 may include a first display area. The second display panel 121 may include a second display area. The first display panel 111 may include a plurality of pixels to display an image, and the second display panel 121 may include a plurality of pixels to display an image. For example, the first display area may be disposed on a front surface of the electronic apparatus 10 and the second display area may be disposed on a rear surface of the electronic apparatus 10.

The first panel driver 113 may provide a driving signal DS1 to the first display panel 111 to drive the first display panel 111. The second panel driver 123 may provide a driving signal DS2 to the second display panel 121 to drive the second display panel 121. For example, the first panel driver 113 may include a scan driver providing scan signals to the pixels, a data driver providing data signals to the pixels, and a timing controller controlling the scan driver and the data driver, and, for example, the second panel driver 123 may include a scan driver providing scan signals to the pixels, a data driver providing data signals to the pixels, and a timing controller controlling the scan driver and the data driver.

The sensor module 500 may include a plurality of sensors to sense internal circumstances and external circumstances of the electronic apparatus 10 to control activation and deactivation of the display areas. In an exemplary embodiment, the sensor module 500 may include a touch screen 510, a button 530, an illumination sensor 540, a sound sensor 550, a gyro sensor 560, and a proximity sensor 570.

The touch screen 510 may sense a touch input TS from the display areas and provide the touch input TS to the display controller 300. For example, the touch screen 510 may sense a first touch input from the first display area and a second touch input from the second display area. The touch positions, the touch areas, and the numbers of touches may be respectively determined from the first and second touch inputs. The touch screen 510 may be overlapped with the display panel, or the touch screen 510 may be integrally formed with the display panel. The button 530 may be disposed on at least a surface of the electronic apparatus 10. The button 530 may convert a user input to an electrical button input signal BS and provide the button input signal BS to the display controller 300. The illumination sensor 540 may be disposed on at least a surface of the electronic apparatus 10. The illumination sensor 540 may sense ambient illumination information CS and provide the ambient illumination information CS to the display controller 300. The sound sensor 550 may be disposed on at least a surface of the electronic apparatus 10. The sound sensor 550 may receive sound information MS (e.g., intensity of sound, a frequency, and so on) and provide the sound information MS to the display controller 300. The gyro sensor 560 may sense an angular velocity of the electronic apparatus 10, determine inclination information GS of the electronic apparatus 10 based on the angular velocity, and provide the inclination information GS to the display controller 300. The proximity sensor 570 may determine whether an object or a user is close to the electronic apparatus 10 and output proximity sensing information AS to the display controller 300.

The display controller 300 may control activation and deactivation of the first display area and the second display area based on the sensing signal received from the sensor module 500. In an exemplary embodiment, the display controller 300 may turn on or turn off the first display area and the second display area by controlling power supply to the first display area and the second display area. Alternatively, the display controller 300 may control display of an image on the first display area and the second display area by controlling the control signal and/or image data of the first display area and the second display area.

In an exemplary embodiment, the display controller 300 may control the activation and deactivation of the display areas based on the touch input TS received from the touch screen 510. For example, the display controller 300 may select the activated display area based on the first and second inputs (e.g., the touch areas, the numbers of touches, the touch motions, and so on), and the display controller 300 may control the driving of the first display apparatus 110 and the second display apparatus 120 and power supply to the first display apparatus 110 and the second display apparatus 120. The display controller 300 may provide a first control signal CTL1 determining activation and deactivation of a driving circuit and a power managing circuit of the first display apparatus 110 to control the activation and the deactivation of the first display area. The display controller 300 may provide a second control signal CTL2 determining activation and deactivation of a driving circuit and a power managing circuit of the second display apparatus 120 to control the activation and the deactivation of the second display area. For example, the display controller 300 may deactivate the first display apparatus 110 and may not provide power to the first display apparatus 110 to deactivate the first display apparatus such that the power consumption may be reduced.

Furthermore, the display controller 300 may control the activation and the deactivation of the first display area and the second display area based on at least one of the signals received from the button 530, the illumination sensor 540, the sound sensor 550, the gyro sensor 560, and the proximity sensor 570.

In an exemplary embodiment, the display controller 300 may control the activation and the deactivation of the first display area and the second display area based on the ambient illumination information CS sensed by the illumination sensor 540. When a first intensity of illumination which is sensed in the first display area is greater than a second intensity of illumination which is sensed in the second display area, the display controller 300 may activate the first display area and deactivate the second display area. For example, when the electronic apparatus 10 is disposed on a desk, the display controller 300 may determine that the second display area is close to an object using the proximity sensor 570 and the second intensity of illumination sensed in the second display area is relatively low using the illumination sensor 540. In this case, the display controller 300 may determine that the second display area may not be used so that the display controller 300 may deactivate (or turn off) the second display area.

In an exemplary embodiment, the display controller 300 may control the activation and the deactivation of the first display area and the second display area based on the sound information MS sensed by the sound sensor 550. When a first sound which is sensed on the first display area is greater than a second sound which is sensed on the second display area, the display controller 300 may activate the first display area and deactivate the second display area. For example, when a user operates a video conference or a video call using the electronic apparatus 10 and the first sound is continuously sensed on the first display area, the display controller 300 may determine that the second display area may not be used so that the display controller 300 may deactivate the second display area.

In an exemplary embodiment, the display controller 300 may control the activation and the deactivation of the first display area and the second display area based on the inclination information GS sensed by the gyro sensor 560 and the proximity sensing information AS sensed by the proximity sensor 570. When the second display area is toward a ground or facing downward, the display controller 300 may activate the first display area and deactivate the second display area. For example, when the electronic apparatus 10 is disposed on a desk, the display controller 300 may determine that the second display area is close to an object and the second display area is toward the ground using the proximity sensor 570 and the gyro sensor 560. In this case, the display controller 300 may determine that the second display area may not be used so that the display controller 300 may deactivate the second display area.

Furthermore, the display controller 300 may control the activation and the deactivation of the first display area and the second display area based on the button input signal BS received from the button 530. For example, when a first button is pressed, the activation and the deactivation of the first display area may be switched. For example, when a second button is pressed, the activation and the deactivation of the second display area may be switched.

Furthermore, the display controller 300 may control the activation and the deactivation of the first display area and the second display area by receiving any of various signals representing various circumstances from a processor, and so on.

The electronic apparatus 10 includes a plurality of the display areas (or the display surfaces), the activated display area is selected to control the activation and the deactivation of the display areas based on the touch input (e.g., the touch area, the number of the touches, the touch motion, and so on) from the display areas. Thus, the electronic apparatus 10 including the multiple-display apparatus may be easily controlled and the user convenience may be enhanced. In addition, the electronic apparatus 10 drives the display areas using the display apparatuses 110 and 120 which are independent from each other, and the display apparatus driving the deactivated display area may be turned off such that the power consumption may be reduced.

FIGS. 2, 3, 4A, and 4B are conceptual diagrams illustrating display areas of the electronic apparatus 10 of FIG. 1.

Referring to FIGS. 2, 3, 4A, and 4B, the display area may surround four surfaces of the electronic apparatus 10.

Figure 2:
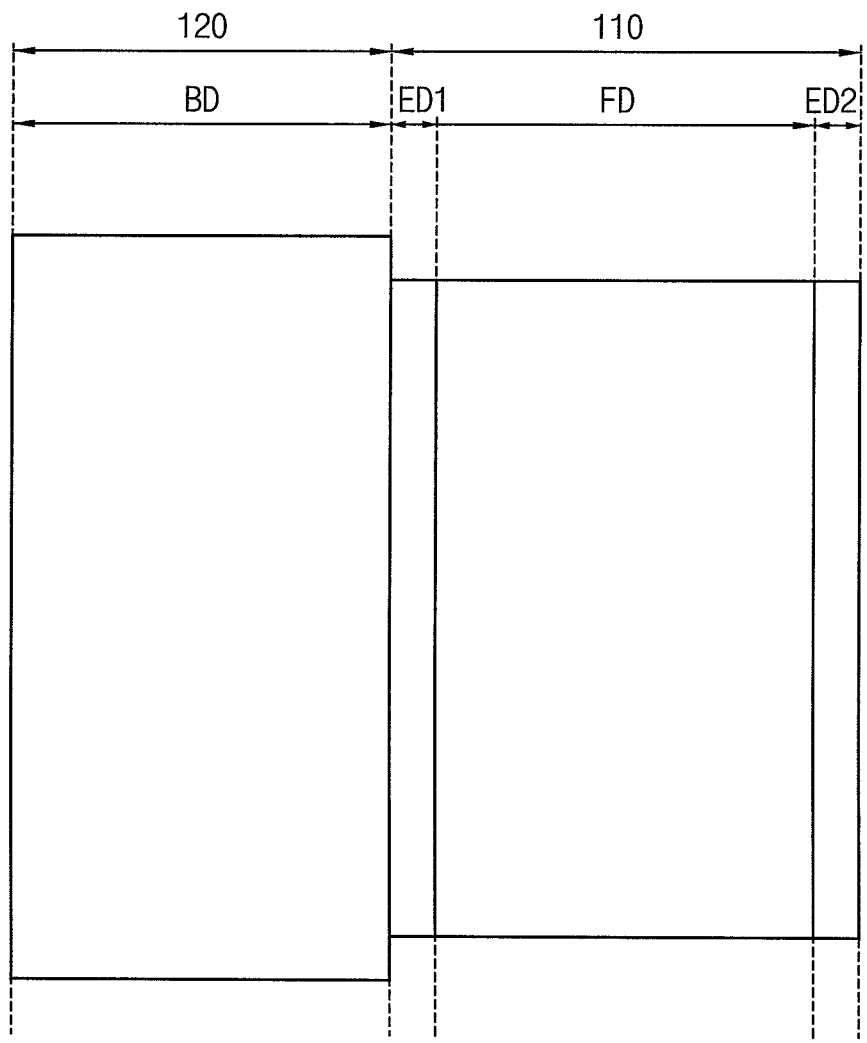
FIGS. 2, 3, 4A, and 4B are conceptual diagrams illustrating display areas of the electronic apparatus of FIG. 1.

In an embodiment, as shown in FIG. 2, when the display area is developed in a plane, the display areas may include a first display area FD, a third display area ED1, and a fourth display area ED2 which are included in the first display apparatus 110, and a second display area BD which is included in the second display apparatus 120. The first display area FD may be a front display area disposed on a front surface of the electronic apparatus 10. The second display area BD may be a rear display area disposed on a rear surface of the electronic apparatus 10. The third and fourth display areas ED1 and ED2 may be side display areas disposed at a left side and a right side, respectively, of the electronic apparatus 10.

Figure 3:
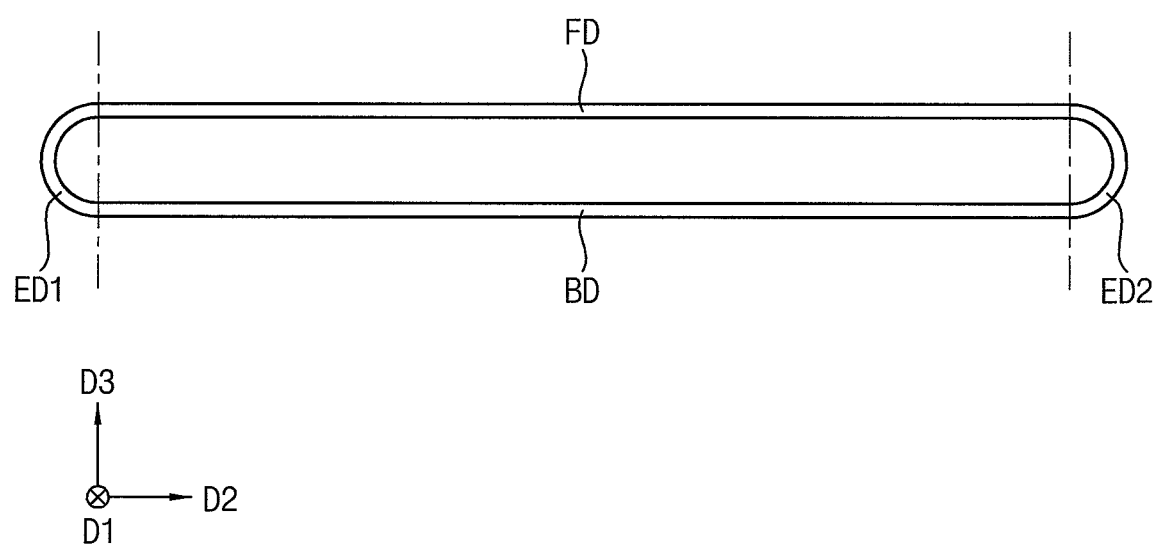

As shown in FIG. 3, the display area may surround the four sides of the electronic apparatus 10. In an exemplary embodiment, the third display area ED1 may have a uniform curvature and connect a first side of the first display area FD and a first side of the second display area BD, and the fourth display area ED2 may have a uniform curvature and connect a second side of the first display area FD and a second side of the second display area BD.

Figure 4A:
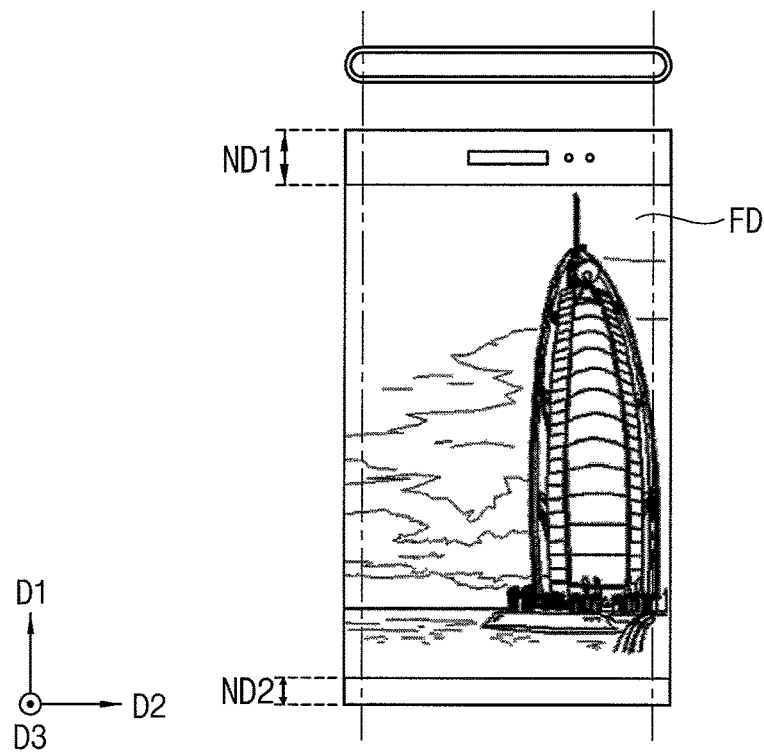
Figure 4B:
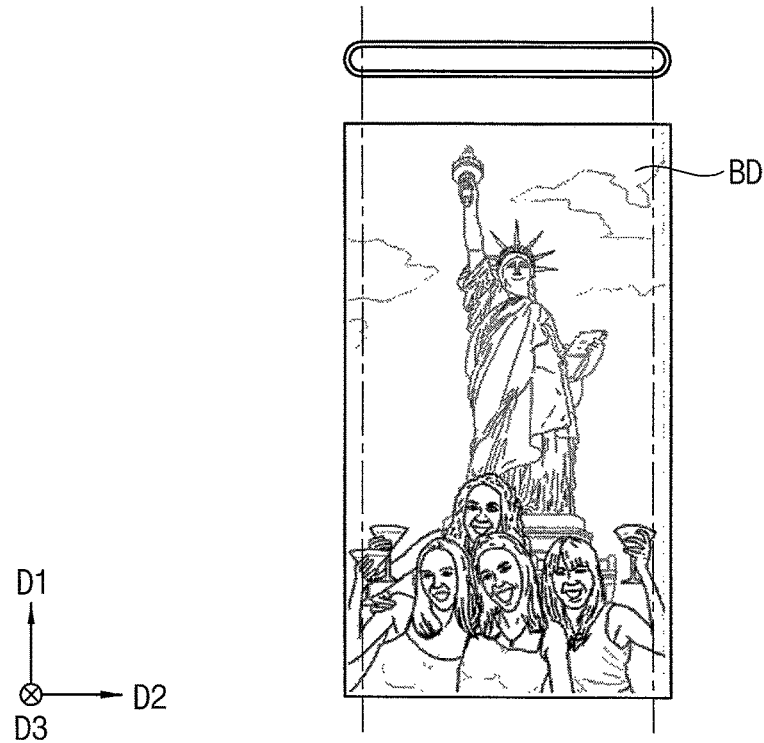

As shown in FIGS. 4A and 4B, the first display area FD and the second display area BD may have sizes different from each other. For example, as illustrated in FIG. 4A, the front surface of the electronic apparatus 10 may include a non-display area (e.g., an upper non-display area ND1 and a lower non-display area ND2) except for the first display area FD. A speaker and various sensors (e.g., the camera, the proximity sensor, the fingerprint sensor, and so on) may be disposed in the upper non-display area ND1 and/or the lower non-display area ND2. In an embodiment, in contrast, as illustrated in FIG. 4B, the second display area BD may be disposed in the entire rear surface of the electronic apparatus 10 such that the rear surface of the electronic apparatus 10 may have a bezel-less shape not substantially including the non-display area.

Although the display areas surround the four surfaces of the electronic apparatus 10 in the present exemplary embodiment, the present inventive concept is not limited thereto. Alternatively, the electronic apparatus 10 may only include the front display area and the rear display area. Alternatively, the electronic apparatus 10 may include first to third display areas surrounding three surfaces of the electronic apparatus 10.

Although the third and fourth display areas have uniform curvatures in the present exemplary embodiment, the present inventive concept is not limited thereto. Further, the present inventive concept is not limited to the shapes of the display areas. For example, the display areas may form a rectangular parallelepiped.

FIGS. 5A, 5B, 6A, and 6B are conceptual diagrams illustrating control of activation and deactivation of the display areas based on a touch area.

Referring to FIGS. 5A, 5B, 6A, and 6B, the electronic apparatus 10 may control the activation and deactivation of the display areas based on the touch areas corresponding to the display areas.

In an exemplary embodiment, when a first touch area of a first touch input is larger than a first threshold area, the display controller 300 may deactivate the first display area. When a second touch area of a second touch input is larger than a second threshold area, the display controller 300 may deactivate the second display area. For example, when the touch area (the first touch area) is larger than ⅓ of the entire first display area, the display controller 300 may deactivate the first display area. When the first touch area is large, a large area of the first display area is not shown to a user so that the first display area may be deactivated to reduce the power consumption.

Figure 5A:
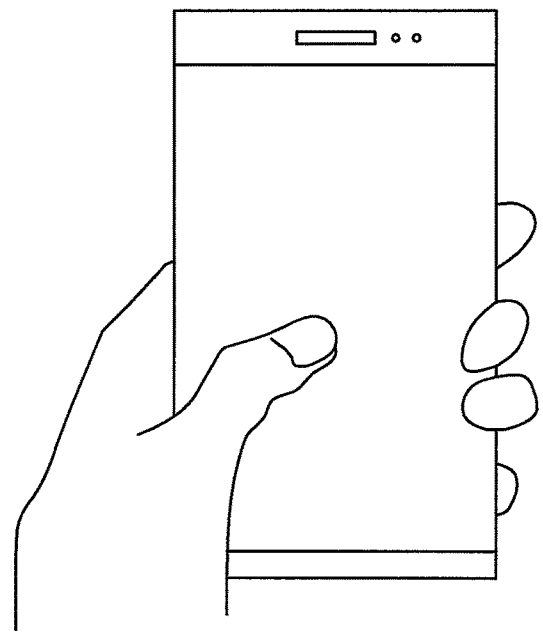
FIGS. 5A, 5B, 6A, and 6B are conceptual diagrams illustrating control of activation and deactivation of the display areas based on a touch area.
Figure 5B:
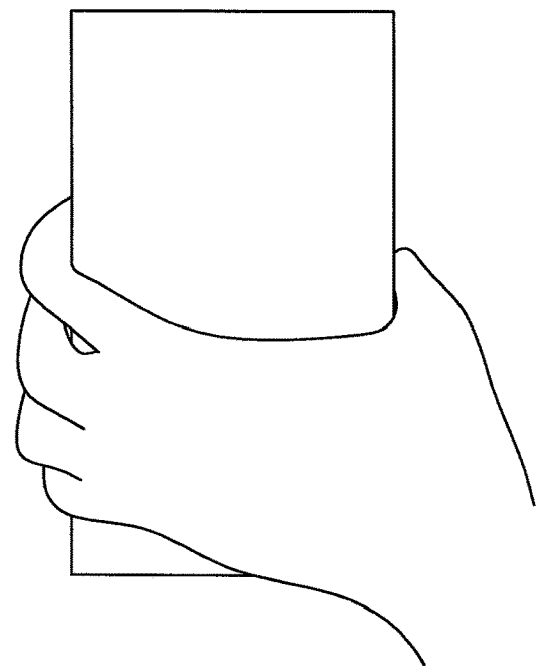
Figure 6A:
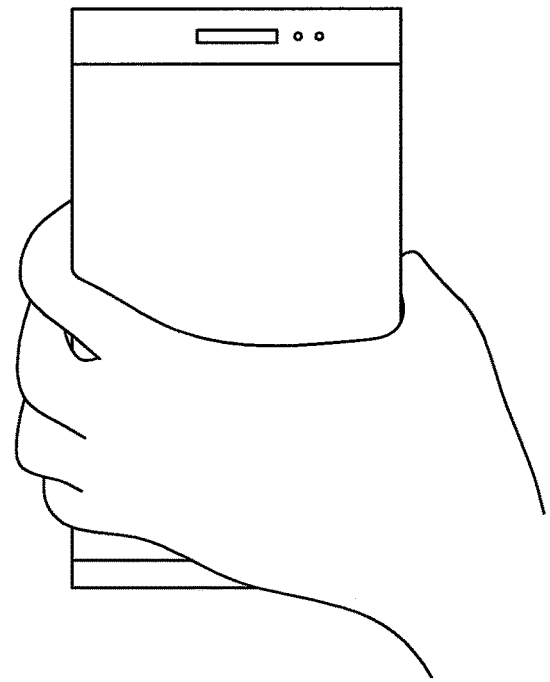
Figure 6B:
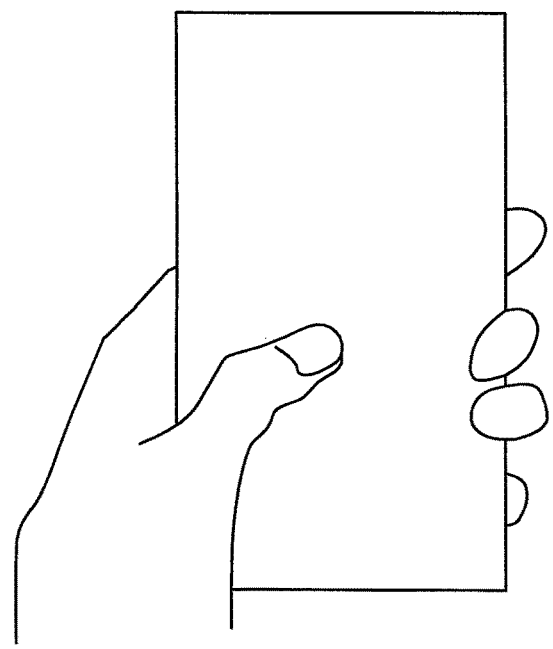

As shown in FIGS. 5A and 5B, a user may grab the electronic apparatus 10 by a hand such that the front surface of the electronic apparatus 10 is exposed. In this case, the first display area may be determined as an activated display area used by the user, and the second display area may be determined as a deactivated display area not used by the user based on the first touch area and the second touch area. Thus, the second display area may be turned off and only the first display area may display the image to reduce the power consumption. In contrast, as shown in FIGS. 6A and 6B, a user may grab the electronic apparatus 10 by a hand such that the rear surface of the electronic apparatus 10 is exposed. In this case, the second display area may be determined as the activated display area used by the user, and the first display area may be determined as the deactivated display area not used by the user based on the first touch area and the second touch area. Thus, the first display area may be turned off and only the second display area may display the image.

In an exemplary embodiment, when the first touch area of the first touch input is less than the second touch area of the second touch input, the display controller 300 may activate the first display area and deactivate the second display area. In contrast, when the second touch area of the second touch input is less than the first touch area of the first touch input, the display controller 300 may activate the second display area and deactivate the first display area. In FIGS. 5A and 5B, when the user grabs the electronic apparatus 10 such that the front surface of the electronic apparatus 10 is exposed, the first touch area is less than the second touch area, and the second display area may be deactivated and only the first display area may display the image. In FIGS. 6A and 6B, when the user grabs the electronic apparatus 10 such that the rear surface of the electronic apparatus 10 is exposed, the second touch area is less than the first touch area, and the first display area may be deactivated and only the second display area may display the image.

In an exemplary embodiment, when the first touch area of the first touch input is less than the second touch area of the second touch input, the display controller 300 may set the first display area as a main display area displaying a main image and the second display area as a sub display area displaying a sub image. In contrast, when the second touch area of the second touch input is less than the first touch area of the first touch input, the display controller 300 may set the second display area as the main display area and the first display area as the sub display area. In an expansion mode which displays different images (e.g., continuous images) on the first display area and the second display area of multiple display modes, the main display area may be determined by comparing the touch areas of the display areas.

FIGS. 7A, 7B, 8A, and 8B are conceptual diagrams illustrating control of activation and deactivation of the display areas based on a number of touches.

Referring to FIGS. 7A, 7B, 8A, and 8B, the electronic apparatus 10 may control the activation and deactivation of the display areas based on the numbers of touches corresponding to the display areas.

In an exemplary embodiment, when a first number of touches of a first touch input is greater than a first threshold value, the display controller 300 may deactivate the first display area. When a second number of touches of a second touch input is greater than a second threshold value, the display controller 300 may deactivate the second display area. For example, when the number of touches of the first touch input is equal to or greater than three, the display controller 300 may deactivate the first display area.

Figure 7A:
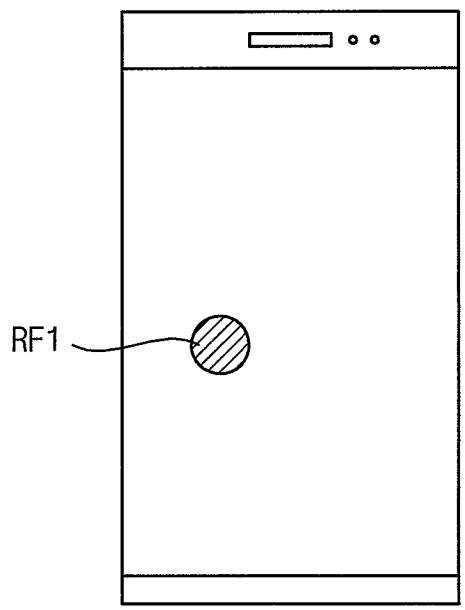
FIGS. 7A, 7B, 8A, and 8B are conceptual diagrams illustrating control of activation and deactivation of the display areas based on a number of touches.
Figure 7B:
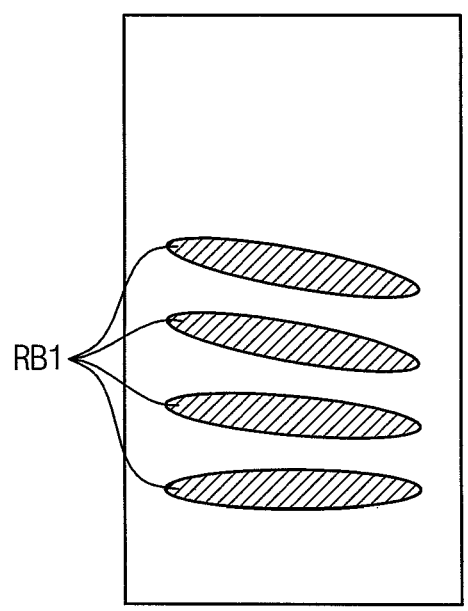
Figure 8A:
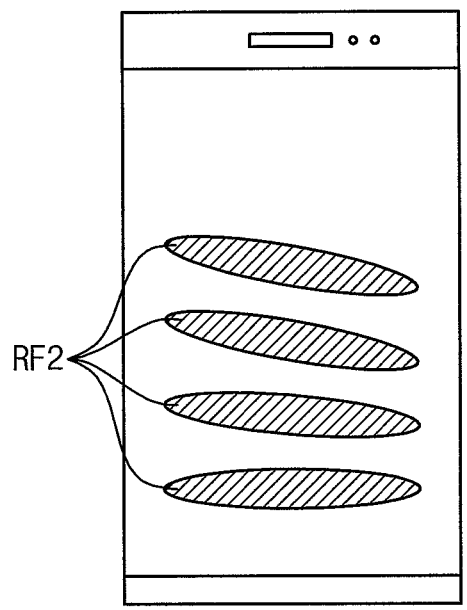
Figure 8B:
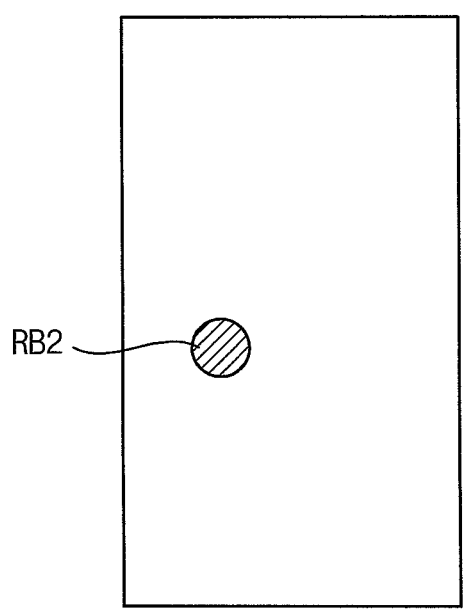

As shown in FIGS. 7A and 7B, a user may grab the electronic apparatus 10 by a hand such that the front surface of the electronic apparatus 10 is exposed. In this case, the first number of touches RF1 of the first touch input may be one, and the second number of touches RB1 of the second touch input may be four. The electronic apparatus 10 may determine the first display area as an activated display area used by the user and the second display area as a deactivated display area not used by the user based on the numbers of touches. Thus, the second display area may be turned off and only the first display area may display the image to reduce the power consumption. In contrast, as shown in FIGS. 8A and 8B, a user may grab the electronic apparatus 10 by a hand such that the rear surface of the electronic apparatus 10 is exposed. In this case, the first number of touches RF2 of the first touch input may be four, and the second number of touches RB2 of the second touch input may be one. The electronic apparatus 10 may determine the second display area as the activated display area used by the user and the first display area as the deactivated display area not used by the user based on the numbers of touches. Thus, the first display area may be turned off and only the second display area may display the image.

In an exemplary embodiment, when the first number of touches of the first touch input is less than the second number of touches of the second touch input, the display controller 300 may activate the first display area and deactivate the second display area. In contrast, when the second number of touches of the second touch input is less than the first number of touches of the first touch input, the display controller 300 may activate the second display area and deactivate the first display area. In FIGS. 5A and 5B, when the user grabs the electronic apparatus 10 such that the front surface of the electronic apparatus 10 is exposed, the second display area may be deactivated and only the first display area may display the image. In FIGS. 6A and 6B, when the user grabs the electronic apparatus 10 such that the rear surface of the electronic apparatus 10 is exposed, the first display area may be deactivated and only the second display area may display the image.

In an exemplary embodiment, when the first number of touches of the first touch input is less than the second number of touches of the second touch input, the display controller 300 may set the first display area as a main display area displaying a main image and the second display area as a sub display area displaying a sub image. In contrast, when the second number of touches of the second touch input is less than the first number of touches of the first touch input, the display controller 300 may set the second display area as the main display area and the first display area as the sub display area. In the expansion mode, the main display area may be determined by comparing the numbers of touches of the display areas.

Figure 9A:
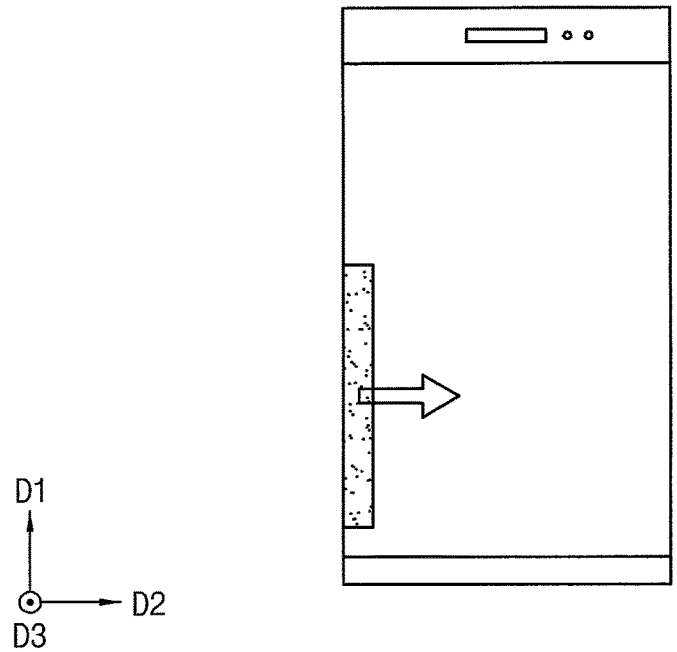
FIGS. 9A, 9B, and 9C are conceptual diagrams illustrating control of activation and deactivation of the display areas based on a touch motion.
Figure 9B:
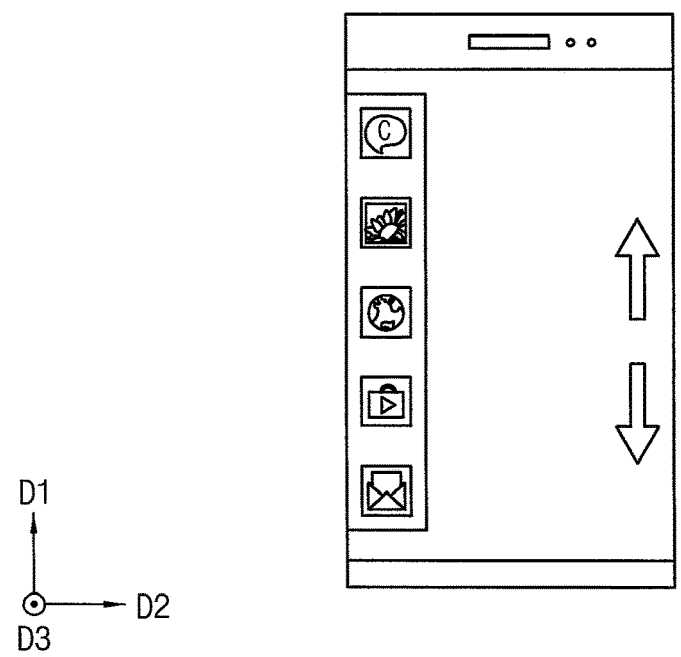
Figure 9C:
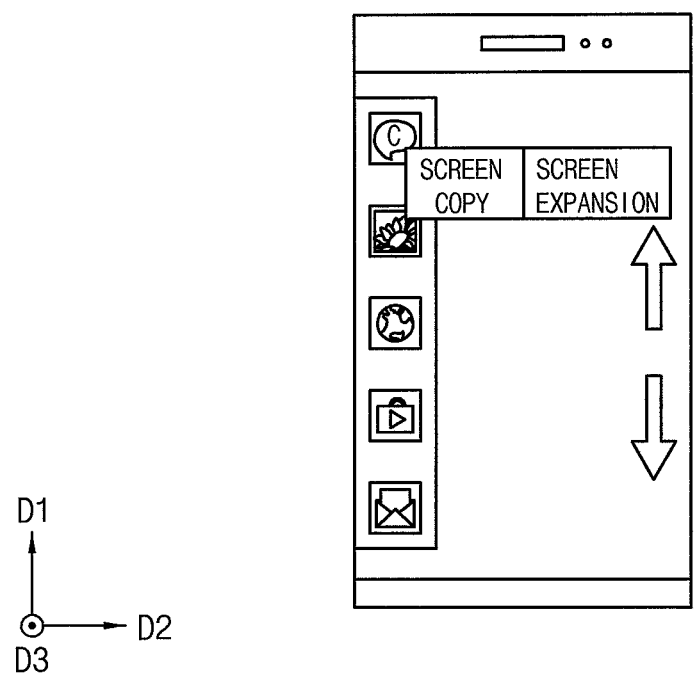

FIGS. 9A, 9B, and 9C are conceptual diagrams illustrating control of activation and deactivation of the display areas based on a touch motion.

Referring to FIGS. 9A, 9B, and 9C, the electronic apparatus 10 may control the activation and deactivation of the display areas based on the touch motion inputted from the corresponding display areas.

In an exemplary embodiment, when a first touch input is a drag operation which forms a pattern, at least one of the first display area and the second display area may be activated or deactivated based on the pattern.

As shown in FIG. 9A, a user may drag from an edge of the first display area or a third display area (e.g., a left side display area) toward a right direction (e.g., a second direction D2) to open a side control window.

As shown in FIG. 9B, icons of recently operated applications and/or bookmarked applications may be displayed in the side control window. When the side control window is displayed and a drag operation forming a pattern (e.g., a predetermined pattern) is inputted, the activation and the deactivation of the display areas may be controlled. In an exemplary embodiment, when the side control window is displayed and the user drags from a specific area toward a lower direction (e.g., an opposite direction of a first direction D1), the first display area may be deactivated. In an exemplary embodiment, when the side control window is displayed and the user drags from a specific area toward an upper direction (e.g., the first direction D1), the second display area may be deactivated. For example, the specific area may be a portion of the fourth area (e.g., a right side display area).

As shown in FIG. 9C, when the first and second display areas are activated and the icon in the side control window is touched, a multiple-display mode window to select a mode among multiple display modes may be displayed. For example, the user may select a copy mode to display the same image on the first display area and the second display area and an expansion mode to display the different images on the first display area and the second display area.

Although the directions of the drag operations to activate and deactivate the display areas are explained referring to FIG. 9B, the present inventive concept is not limited to the touch pattern. Alternatively, for example, the activation and the deactivation of the display areas may be controlled by a multi-tapping operation or a drag operation of any of various shapes (e.g., a circle pattern, a heart-shaped pattern, and so on).

Figure 10:
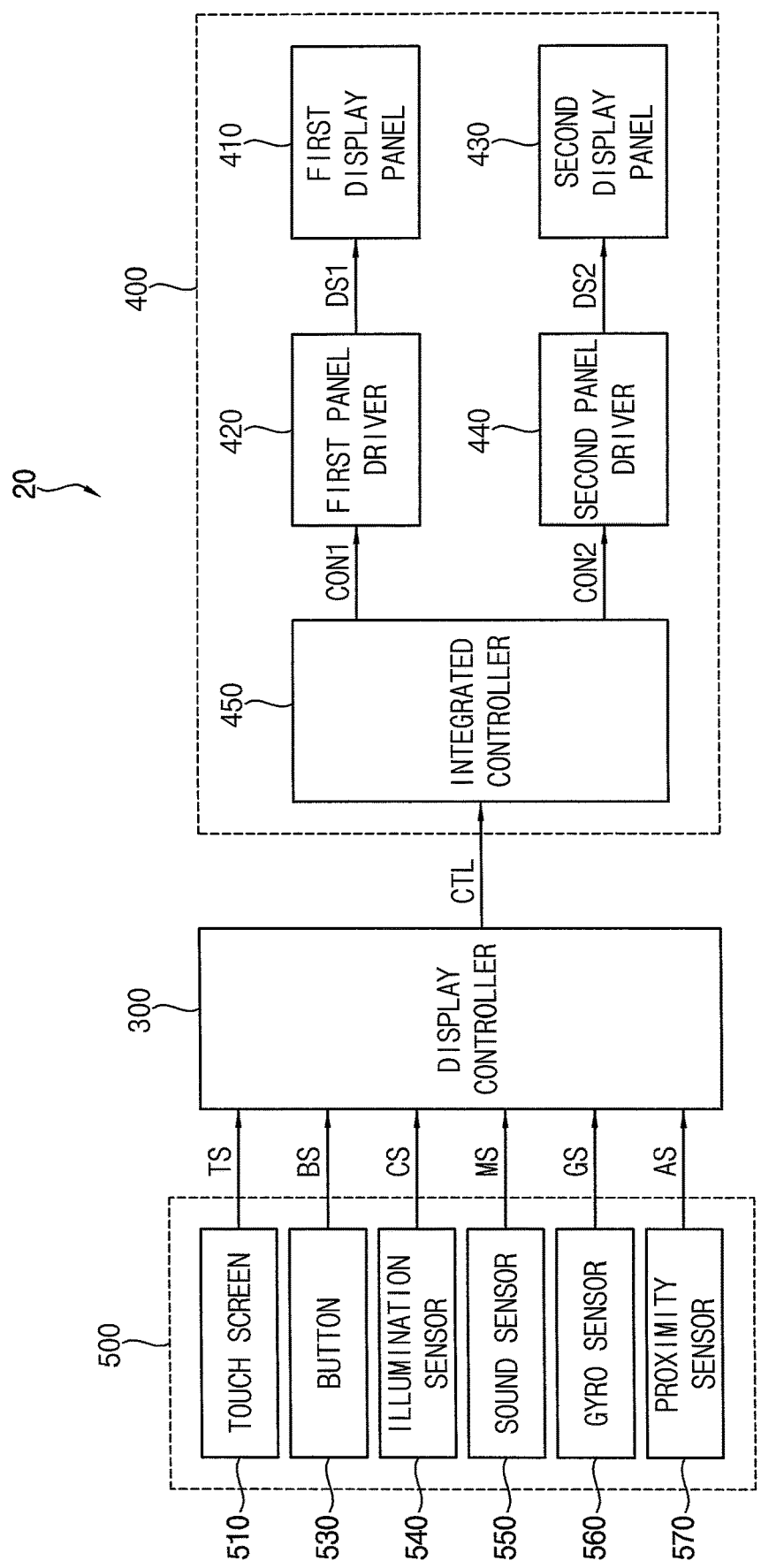
FIG. 10 is a block diagram illustrating an electronic apparatus according to an exemplary embodiment of the present inventive concept.

FIG. 10 is a block diagram illustrating an electronic apparatus 20 according to an exemplary embodiment of the present inventive concept.

Referring to FIG. 10, the electronic apparatus 20 includes a display part 400, a display controller 300, and a sensor module 500. The electronic apparatus 20 according to the present exemplary embodiment is substantially the same as the electronic apparatus 10 of the previous exemplary embodiment described with reference to FIG. 1 except that first and second display panels 410 and 430 are controlled by an integrated controller 450. Thus, the same reference numerals will be used to refer to the same or like parts as those described in the previous exemplary embodiment of FIG. 1 and any repetitive explanation concerning the above elements will be omitted.

The display part 400 includes a multiple-display apparatus including a plurality of display surfaces. The display part 400 may include a first display area and a second display area opposite to the first display area.

In an exemplary embodiment, the display part 400 includes a first display panel 410 including a first display area and a second display panel 430 including a second display area. The first panel driver 420 may provide a driving signal DS1 to the first display panel 410 to drive the first display panel 410. The second panel driver 440 may provide a driving signal DS2 to the second display panel 430 to drive the second display panel 430. For example, the first panel driver 420 may include a scan driver providing scan signals to the pixels and a data driver providing data signals to the pixels, and, for example, the second panel driver 440 may include a scan driver providing scan signals to the pixels and a data driver providing data signals to the pixels.

In an embodiment, the integrated controller 450 may be a timing controller generating a first signal CON1 and a second signal CON2 to control the first panel driver 420 and the second panel driver 440, respectively. For example, the integrated controller 450 may deactivate the first signal CON1 and may not provide power to the first display panel 410 and the first panel driver 420 to deactivate the first display area. In addition, the integrated controller 450 may deactivate the second signal CON2 and may not provide power to the second display panel 430 and the second panel driver 440 to deactivate the second display area.

The display controller 300 may control activation and deactivation of the first display area and the second display area based on a sensing signal received from the sensor module 500. In an exemplary embodiment, the display controller 300 may provide a control signal CTL to control the activation and the deactivation of the first display area and the second display area to the integrated controller 450. A method of controlling the activation and the deactivation of the first display area and the second display area based on the sensing signal is explained in the previous exemplary embodiment, and repetitive explanation will be omitted.

The sensor module 500 may include a plurality of sensors to sense internal circumstances and external circumstances of the electronic apparatus 20 to control activation and deactivation of the display areas.

The electronic apparatus 20 includes the single integrated controller driving the plural display panels such that the manufacturing cost may be reduced compared to the electronic apparatus 10 of FIG. 1.

Figure 11:
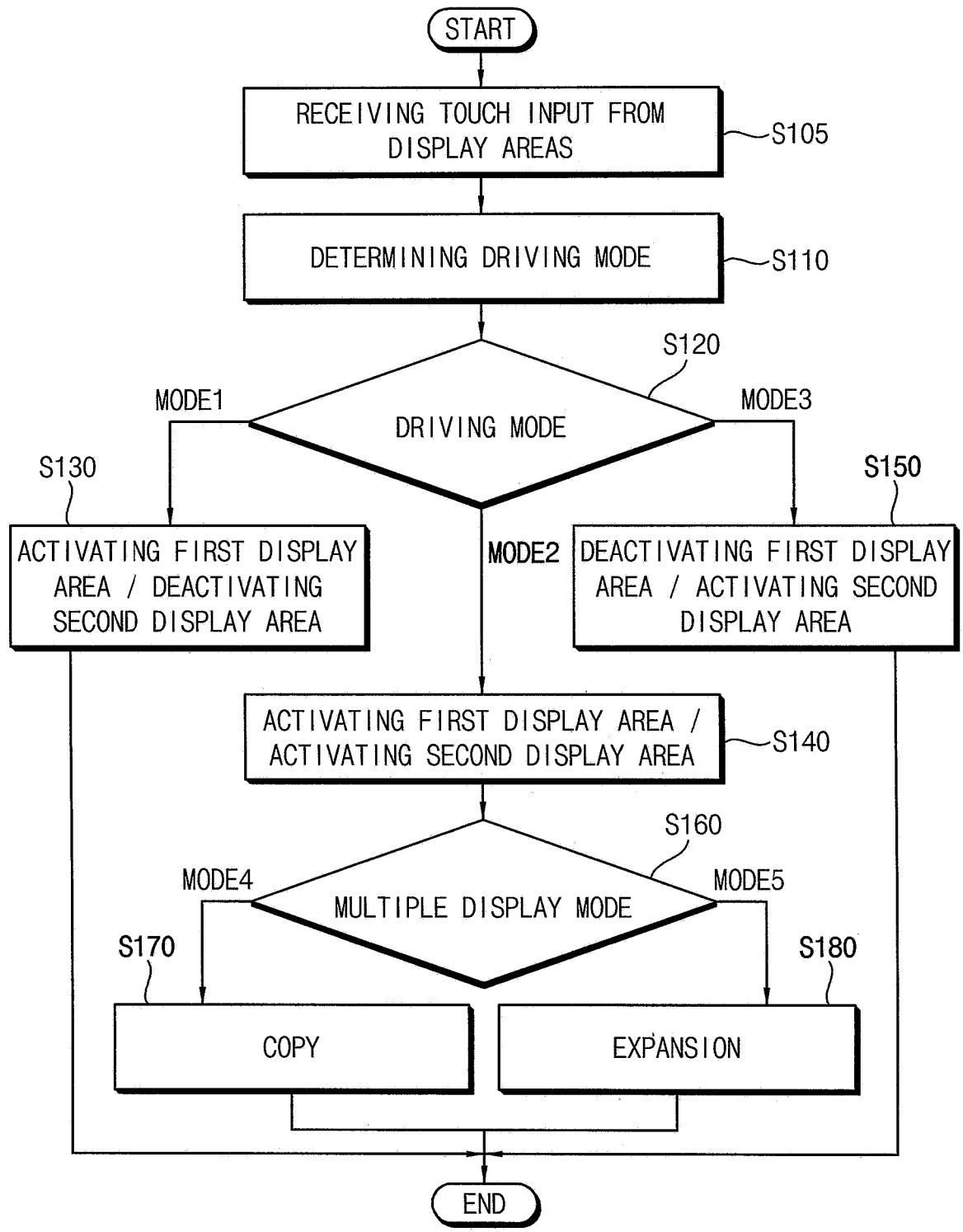
FIG. 11 is a flowchart illustrating a method of driving an electronic apparatus, according to an exemplary embodiment of the present inventive concept.

FIG. 11 is a flowchart illustrating a method of driving an electronic apparatus, according to an exemplary embodiment of the present inventive concept.

Referring to FIG. 11, in the method of driving the electronic apparatus, the display controller may receive at least one of a first touch input from a first display area and a second touch input from a second display area (step S105).

A driving mode may be determined based on the first touch input and the second touch input (step S110). In an exemplary embodiment, the driving mode may be determined by comparing a first touch area of the first touch input and a second touch area of the second touch input. In another exemplary embodiment, the driving mode may be determined by comparing a first number of touches of the first touch input and a second number of touches of the second touch input. A method of selecting the activated display area based on the touch area or the number of touches is explained above, and repetitive explanation will be omitted.

According to the selected driving mode, the activation and the deactivation of the first display area and the second display area may be controlled (step S120).

When the driving mode of the electronic apparatus is a first driving mode MODE1, the first display area is activated (or turned on) and the second display area is deactivated (or turned off) (step S130).

When the driving mode of the electronic apparatus is a third driving mode MODE3, the second display area is activated and the first display area is deactivated (step S150).

When the driving mode of the electronic apparatus is a second driving mode MODE2, the first display area and the second display area are activated (step S140). In the second driving mode MODE2, a multiple-display mode may be determined according to a predetermined priority or the touch input (step S160). For example, a copy mode MODE4 or an expansion mode MODE5 may be selected by a user in an operation of an application. When the copy mode MODE4 is selected, the same image may be displayed on the first display area and the second display area (step S170). In contrast, when the expansion mode MODE5 is selected, different images (e.g., portions of a continuous image) may be displayed on the first display area and the second display area (step S180).

According to the method of driving the electronic apparatus, the activation and the deactivation of the display areas are automatically controlled according to the touch input so that the user convenience may be enhanced.

Although the display mode is determined based on the touch input from the display areas in the present exemplary embodiment, the present invention is not limited to the method of determining the display mode. Alternatively, the display mode may be determined based on a sensing signal received from the sensor module, and the activation and the deactivation of the display areas may be controlled according to the display mode.

Although the electronic apparatus and the method of driving the electronic apparatus according to some example embodiments have been described with reference to the figures, those skilled in the art will readily appreciate that many modifications are possible in the example embodiments without materially departing from the novel teachings and aspects of the present inventive concept. For example, although with respect to the example embodiments, it is described that the electronic apparatus may be a smartphone, a type of the electronic apparatus is not limited thereto.

The present inventive concept may be applied to an electronic apparatus having the display apparatus. For example, the present inventive concept may be applied to a personal computer, a laptop computer, a mobile phone, a smartphone, a smart pad, a PMP, a PDA, an MP3 player, a digital camera, and a video camcorder.

The foregoing is illustrative of the present inventive concept and is not to be construed as limiting thereof. Although some exemplary embodiments of the present inventive concept have been described, those skilled in the art will readily appreciate that many modifications are possible in the exemplary embodiments without materially departing from the novel teachings and aspects of the present inventive concept. Accordingly, all such modifications are intended to be included within the scope of the present inventive concept as set forth in the claims. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims.

What is claimed is:

1. An electronic apparatus comprising:
a display part including a first display area and a second display area opposite to the first display area;
a touch screen configured to sense a first touch input from the first display area and a second touch input from the second display area; and
a display controller configured to control activation so as to display an image and deactivation so as not to display an image of the first display area and the second display area based on the first touch input and the second touch input,
wherein the display controller is configured to deactivate the first display area when a first touch area of the first touch input is larger than a first threshold area relative to an entire area of the first display area.

2. The electronic apparatus of claim 1, wherein the display controller is configured to deactivate the first display area when a number of touches of the first touch input is equal to or greater than three.

3. The electronic apparatus of claim 1, wherein the display controller is configured to control the activation and the deactivation of at least one of the first display area and the second display area based on a pattern when the first touch input is a drag operation which forms the pattern.

4. The electronic apparatus of claim 3, wherein the display controller is configured to deactivate the first display area when the first touch input is the drag operation from a first position toward a first direction.

5. The electronic apparatus of claim 1, wherein the display controller is configured to control the activation and the deactivation of the first display area and the second display area based on a sensing signal received from a sensor module.

6. The electronic apparatus of claim 5, wherein the sensor module comprises at least one of an illumination sensor, a sound sensor, and a gyro sensor.

7. The electronic apparatus of claim 6, wherein the display controller is configured to activate the first display area and deactivate the second display area when an intensity of a first illumination sensed in the first display area is greater than an intensity of a second illumination sensed in the second display area.

8. The electronic apparatus of claim 6, wherein the display controller is configured to activate the first display area and deactivate the second display area when a first sound sensed on the first display area is greater than a second sound sensed on the second display area.

9. The electronic apparatus of claim 6, wherein the display controller is configured to activate the first display area and deactivate the second display area when the second display area is toward a ground.

10. The electronic apparatus of claim 1, wherein the display part comprises a first display apparatus and a second display apparatus,
wherein the first display apparatus comprises a first display panel including the first display area, and a first panel driver configured to drive the first display panel,
wherein the second display apparatus comprises a second display panel including the second display area, and a second panel driver configured to drive the second display panel, and
wherein the display controller is configured to control a power supply to the first display apparatus and the second display apparatus based on the first touch input and the second touch input.

11. The electronic apparatus of claim 1, wherein the display part further comprises a third display area connecting a side of the first display area and a side of the second display area,
wherein the touch screen is configured to sense a third touch input from the third display area, and
wherein the activation and the deactivation of the first display area and the second display area are controlled based on the third touch input.

12. The electronic apparatus of claim 1, wherein the display controller is configured to deactivate the first display area when the first touch area of the first touch input is larger than one third of the entire area of the first display area.

13. An electronic apparatus comprising:
a display part including a first display area and a second display area opposite to the first display area;
a touch screen configured to sense a first touch input from the first display area and a second touch input from the second display area; and
a display controller configured to control activation and deactivation of the first display area and the second display area based on the first touch input and the second touch input,
wherein the display controller is configured to set the first display area as a main display area displaying a main image and set the second display area as a sub display area displaying a sub image when a first touch area of the first touch input is less than a second touch area of the second touch input or when a first number of touches of the first touch input is less than a second number of touches of the second touch input.

14. A method of driving an electronic apparatus comprising a display apparatus including a first display area and a second display area opposite to the first display area, the method comprising:
receiving at least one of a first touch input from the first display area and a second touch input from the second display area;
determining a driving mode based on the first touch input and the second touch input; and
controlling activation so as to display an image and deactivation so as not to display an image of the first display area and the second display area according to the driving mode,
wherein the determining the driving mode comprises:
determining a first touch area of the first touch input;
determining a second touch area of the second touch input; and
determining one of a first driving mode, a second driving mode, and a third driving mode as the driving mode based on the first touch area and the second touch area, the first driving mode activating the first display area and deactivating the second display area, the second driving mode activating the first display area and activating the second display area, and the third driving mode deactivating the first display area and activating the second display area, wherein the first display area is deactivated when the first touch area of the first touch input is larger than a first threshold area relative to an entire area of the first display area.

15. The method of claim 14, wherein the determining the driving mode comprises:
   determining a first number of touches of the first touch input;
   determining a second number of touches of the second touch input; and
   determining one of the first driving mode, the second driving mode, and the third driving mode as the driving mode based on the first number of touches and the second number of touches, the first driving mode activating the first display area and deactivating the second display area, the second driving mode activating the first display area and activating the second display area, and the third driving mode deactivating the first display area and activating the second display area.

16. The method of claim 14, further comprising controlling the activation and the deactivation of the first display area and the second display area based on a sensing signal received from a sensor module.

17. The method of claim 14, wherein the first display area is deactivated when the first touch area of the first touch input is larger than one third of the entire area of the first display area.

* * * * *